(12) United States Patent
Horng et al.

(10) Patent No.: US 7,077,572 B2
(45) Date of Patent: Jul. 18, 2006

(54) LUBRICATING OIL GUIDING SYSTEM FOR MOTOR BEARINGS

(75) Inventors: Alex Horng, Kaohsiung (TW);
Yin-Rong Hong, Kaohsiung (TW);
Wen-Kuan Chen, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 104 days.

(21) Appl. No.: 10/863,264

(22) Filed: Jun. 9, 2004

(65) Prior Publication Data

US 2005/0276528 A1 Dec. 15, 2005

(51) Int. Cl.
*F16C 17/02* (2006.01)

(52) U.S. Cl. .................................................. 384/114

(58) Field of Classification Search ............... 384/114, 384/119, 120, 107, 112
See application file for complete search history.

(56) References Cited

U.S. PATENT DOCUMENTS

| | | | |
|---|---|---|---|
| 5,762,423 A | 6/1998 | Mori et al. | |
| 5,941,646 A | 8/1999 | Mori et al. | |
| 6,336,745 B1 | 1/2002 | Horng et al. | |
| 6,338,575 B1 | 1/2002 | Chen | |
| 6,435,722 B1 | 8/2002 | Horng | |
| 6,836,041 B1 * | 12/2004 | Chou et al. | 384/114 |
| 2004/0042695 A1 * | 3/2004 | Shishido et al. | 384/107 |

FOREIGN PATENT DOCUMENTS

TW 576482 2/2004

* cited by examiner

*Primary Examiner*—Lenard A. Footland
(74) *Attorney, Agent, or Firm*—Bacon & Thomas, PLLC (57) ABSTRACT

A lubricating oil guiding system for a motor includes an axial tube, a first bearing mounted in the axial tube, a second bearing mounted in the axial tube, at least one separating plate securely mounted to the inner periphery of the axial tube, and at least one auxiliary oil chamber defined between the first bearing, the separating plate, and the shaft for distributing lubricating oil to the first bearing and for storing, buffering, and guiding the lubricating oil. A shaft of a rotor extends through the first bearing, the second bearing, and the separating plate. The first bearing defines an oil circulating loop and the second bearing defines an oil circulating loop. The separating plate is located between the first bearing and the second bearing to avoid mutual interference between the oil circulating loop of the first bearing and the oil circulating loop of the second bearing.

18 Claims, 7 Drawing Sheets

LUBRICATING OIL GUIDING SYSTEM FOR MOTOR BEARINGS

BACKGROUND OF THE INVENTION

1. Field of the Invention

The present invention relates to a lubricating oil guiding system for motor bearings. In particular, the present invention relates to a lubricating oil guiding system using a separating plate placed between two adjacent bearings through which a rotor shaft of a motor extends, thereby achieving even distribution of lubricating oil and thereby improving the lubricating effect and the circulating effect of the lubricating oil.

2. Description of Related Art

Figure 1:
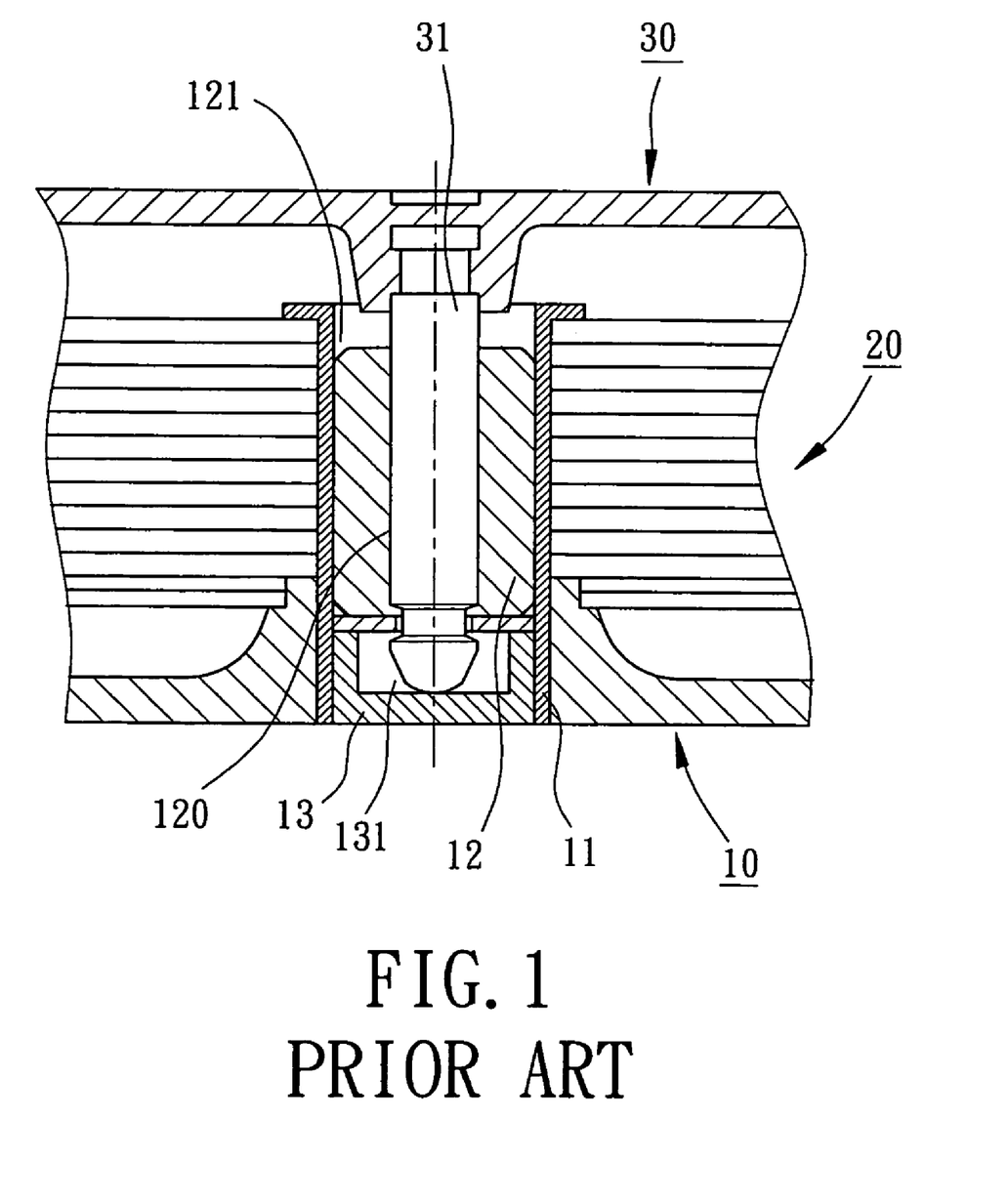
FIG. 1 is a sectional view of a conventional motor.

FIG. 1 of the drawings illustrates a conventional motor comprising a base 10, a stator 20, and a rotor 30. An axial tube 11 is mounted to the base 10, and an oily bearing (or sleeve bearing) 12 is mounted in the axial tube 11. A substantially U-shaped supporting plate 13 is mounted in a bottom end of the axial tube 11 for supporting a distal end of a shaft 31 of the rotor 30 and defines an oil reservoir 131 for receiving lubricating oil. The shaft 31 extends through an axial hole 120 of the oily bearing 12. When the shaft 31 turns, the lubricating oil in the oil reservoir 131 circulates through an inner periphery delimiting the axial hole 120 of the oily bearing 12, a top face of the oily bearing 12, a chamber 121 on the top face of the oily bearing 12, a gap between the oily bearing 12 and the axial tube 11, and a bottom face of the oily bearing 12.

Although the oily bearing 12 may reduce wear to the elements of the motor, the lubricating oil requires supply from the oil reservoir 131 in most cases. Further, since the upper part of the oily bearing 12 is far away from the oil reservoir 131, lubrication of the upper part of the oily bearing 12 can be achieved only when the shaft 31 turns. However, the lubricating effect in the upper part of the oily bearing 12 is unsatisfactory if the oily bearing 12 has a relatively long axial length or loss of lubricating oil occurs. Thus, the friction in the upper part of the oily bearing 12 increases, leading to reduction in the rotating speed of the rotor 30 and generation of noise and heat. Even worse, the shaft 31 would get stuck and thus shorten the life of the motor.

Another conventional motor is disclosed in, e.g., U.S. Pat. Nos. 6,336,745 and 6,435,722. The motor of this type comprises a base, a stator, a rotor, an axial tube, and an oily bearing. The rotor includes a shaft having an annular groove that faces an intermediate portion of the oily bearing. The annular groove assists in storage and circulation of the lubricating oil. Thus, when the shaft turns, the upper part of the oily bearing can be quickly lubricated by the lubricating oil stored in the annular groove. However, after a period of operation, the annular groove may receive excessive lubricating oil, resulting in excessive oil pressure and thus adversely affecting rotational balance of the rotor. Further, the outer lubricating oil path outside the oily bearing is still too long and thus not allows rapid circulation of the lubricating oil.

U.S. Pat. No. 5,941,646 discloses a hydrodynamic type porous oil-impregnated bearing and a bearing device. U.S. Pat. No. 5,762,423 discloses a bearing device, a solid resin lubricating composition, and a porous oil-impregnated bearing. U.S. Pat. No. 6,338,575 discloses self-lubricating bearings and assemblies thereof. According to teachings of these patents, several oil-impregnated bearings can be mounted in an axial tube of a motor to increase the number of circulating lubricating systems. This shortens the lubricating oil path and thus improves the lubricating oil circulating efficiency of the oil-impregnated bearings. However, the outer paths and the inner paths of all of the circulating lubricating systems are communicated and thus interfere with one another, failing to reach the anticipated lubricating oil circulating effect.

A further conventional motor is disclosed in, e.g., Taiwan Utility Model Publication No. 576482. The motor of this type includes an axial tube having an oil reservoir in a bottom thereof. An oily bearing is mounted in the axial tube. An oil inlet is defined in a bottom end of the oil reservoir and aligned with a plurality of lubricating oil grooves defined in an outer periphery of the oily bearing. Each lubricating oil groove includes a through-hole in a bottom wall thereof, with the through-hole being communicated with an oil storage chamber in an axial hole of the oily bearing. The lubricating oil are guided by the lubricating oil grooves and the through-holes back to the oil storage chamber, providing sufficient lubrication to an inner periphery delimiting the axial hole of the oily bearing and the shaft of the rotor. However, formation of the through-holes and the oil storage chamber is difficult. Further, lubrication of the upper part of the oily bearing is not unsatisfactory, as no lubricating oil grooves are defined in the upper part of the oil bearing.

OBJECTS OF THE INVENTION

An object the present invention is to provide a lubricating oil guiding system that shortens the lubricating oil path to improve the lubricating oil circulating efficiency and to prolong the life of the motor.

Another object of the present invention is to provide a lubricating oil guiding system with improved dustproof effect.

SUMMARY OF THE INVENTION

In accordance with an aspect of the present invention, a lubricating oil guiding system for a motor comprises an axial tube, a first bearing mounted in the axial tube and including an axial hole through which a shaft extends, a second bearing mounted in the axial tube and including an axial hole through which the shaft extends, at least one separating plate securely mounted to the inner periphery of the axial tube and including an axial hole through which the shaft extends, and at least one auxiliary oil chamber defined between the first bearing, the separating plate, and the shaft for distributing lubricating oil to the first bearing and for storing, buffering, and guiding the lubricating oil.

The first bearing defines an oil circulating loop and the second bearing defines an oil circulating loop. The separating plate is located between the first bearing and the second bearing to avoid mutual interference between the oil circulating loop of the first bearing and the oil circulating loop of the second bearing.

Other objects, advantages and novel features of this invention will become more apparent from the following detailed description when taken in conjunction with the accompanying drawings.

DETAILED DESCRIPTION OF THE PREFERRED EMBODIMENTS

Preferred embodiments of the present invention are now to be described hereinafter in detail, in which the same reference numerals are used in the preferred embodiments for the same parts as those in the prior art to avoid redundant description.

Figure 2:
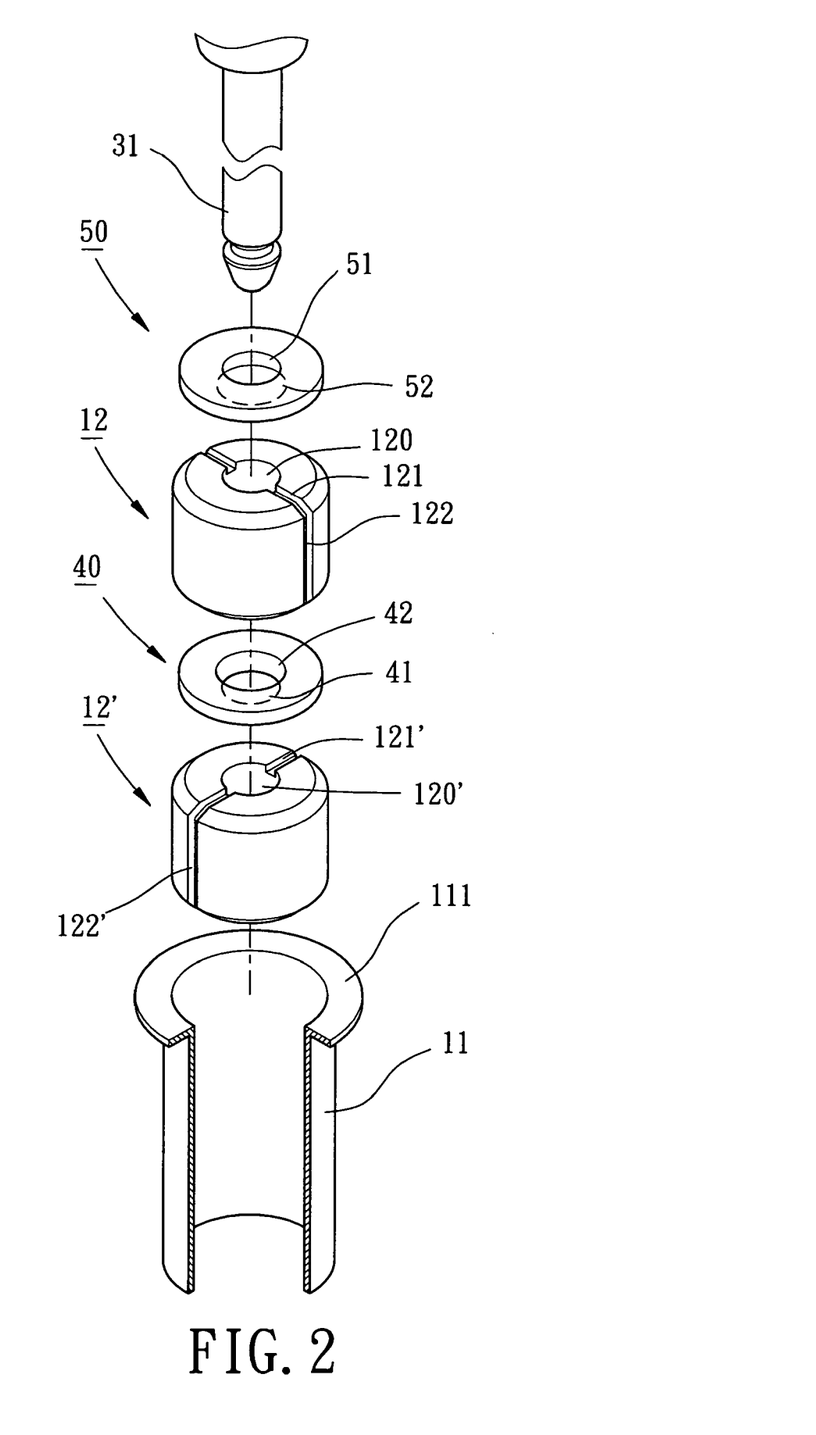
FIG. 2 is an exploded perspective view of a motor with a first embodiment of a lubricating oil guiding system in accordance with the present invention.
Figure 3:
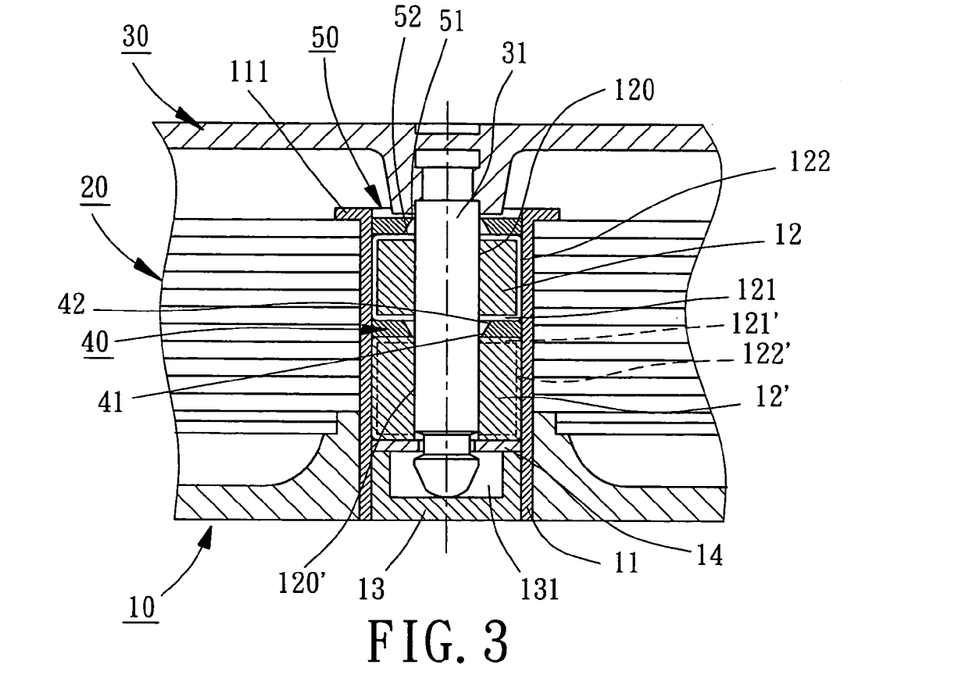
FIG. 3 is a sectional view of the motor in FIG. 2.

Referring to FIGS. 2 and 3, a lubricating oil guiding system in accordance with a first embodiment of the present invention comprises an axial tube 11, at least two bearings 12 and 12', at least one separating plate 40, and a shaft 31. The axial tube 11 is a hollow tube that is fixed to a base 10 and includes a flange 111 on a top end thereof for engaging with a stator 20. In this embodiment, a first bearings 12 and a second bearing 12' are mounted in the axial tube 11, with a separating plate 40 mounted between the bearings 12 and 12'. Nevertheless, more than two bearings and more than one separating member can be used.

The first bearing 12 includes an axial hole 120 through which the shaft 31 extends. An end of the shaft 30 is coupled with a rotor 30. The first bearing 12 defines at least one oil circulating loop. In this embodiment, the first bearing 12 comprises an oil circulating loop including an upper oil path 121 in a top face of the first bearing 12, a lower oil path 121 in a bottom face of the first bearing 12, and two opposite longitudinal oil paths 122 in a periphery of the first bearing 12. These oil paths 121 and 122 are communicated with one another to form an oil loop. Preferably, each of the upper oil path 121 and the lower oil path 121 is communicated with the axial hole 120 of the first bearing 12.

Similarly, the second bearing 12' includes an axial hole 120' through which the shaft 31 extends. The second bearing 12' defines at least one oil circulating loop. In this embodiment, the second bearing 12' comprises an oil circulating loop including an upper oil path 121 ' in a top face of the second bearing 12', a lower oil path 121 ' in a bottom face of the second bearing 12', and two opposite longitudinal oil paths 122' in a periphery of the second bearing 12'. These oil paths 121' and 122' are communicated with one another to form an oil loop. Preferably, each of the upper oil path 121' and the lower oil path 121' is communicated with the axial hole 120' of the second bearing 12'. Preferably, the oil circulating loop of the second bearing 12' is located on a plane orthogonal to that of the oil circulating loop of the first bearing 12.

Referring to FIGS. 2 and 3, the separating plate 40 is made of plastics or metal and located between the first bearing 12 and the second bearing 12'. The separating plate 40 can be mounted in the axial tube 11 by force-fitting or integrally formed with an inner periphery of the axial tube 11.

The separating plate 40 includes an axial hole 41, with an auxiliary oil chamber 42 being defined between the first bearing 12, the separating plate 40, and the shaft 31. Alternatively, the auxiliary oil chamber 42 extends downward and communicates with the second bearing 12'. Preferably, the auxiliary oil chamber 42 is a conic hole that tapers downward.

A dustproof plate 50 is mounted by force-fitting to an uppermost portion of the inner periphery of the axial tube 11. The dustproof plate 50 includes an axial hole 51 that tapers upward to form an auxiliary oil chamber 52. A supporting member 13 and a retainer ring 14 are mounted to a bottom portion of the inner periphery of the axial tube 11. The supporting member 13 is substantially U-shaped and defines a primary oil chamber 131 for receiving lubricating oil, with a bottom wall delimiting the primary oil chamber 131 supporting a distal end of the shaft 31. The retainer ring 14 prevents the shaft 31 from disengaging from the first bearing 12 and the second bearing 12'.

Figure 4:
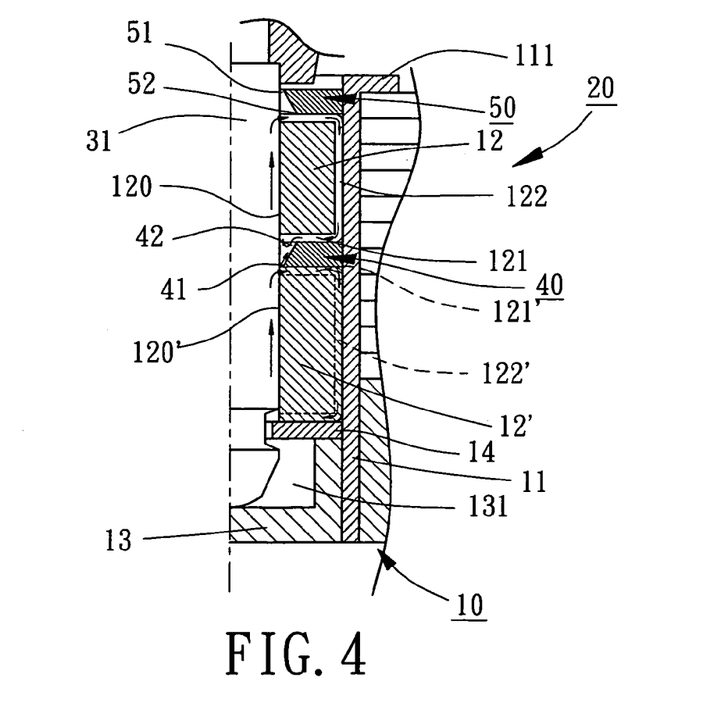
FIG. 4 is an enlarged view of a portion of FIG. 3.

As illustrated in FIGS. 3 and 4, the separating plate 40 not only restrains axial positions of the first bearing 12 and the second bearing 12' but also separates the oil circulating loop of the first bearing 12 from the oil circulating loop of the second bearing 12'. Thus, the oil circulating loop of the first bearing 12 is isolated from the oil circulating loop of the second bearing 12'. If more bearings 12 and 12' and more separating plates 40 are used, more independent oil circulating loops are formed, which shortens the overall length of each oil circulating path and thus improves the oil circulating efficiency per time unit. Further, since the oil circulating loops are independent from each other, mutual interference resulting from different flowing directions of the lubricating oil in the circulating oil loops is prevented.

As illustrated in FIG. 4, when the shaft 31 turns, the lubricating oil in the primary oil chambers 131 flows upward to pass through the axial hole 41 under capillary action and is temporarily stored in the auxiliary oil chamber 42. The lubricating oil stored in the auxiliary oil chamber 42 lubricates the first bearing 12. Thus, the lubricating oil in the primary oil chamber 131 can be effectively distributed to the upper portion of the shaft 31, avoiding non-uniform distribution of the lubricating oil in the axial hole 120. Further, the auxiliary oil chamber 42 provides a buffering space for reducing the speed of the lubricating oil or for adjusting the flowing direction of the lubricating oil. Thus, the lubricating oil can be advantageously guided and circulate along the oil paths 121 and 122.

Nevertheless, the upper and lower oil paths 121 and 121' and/or the longitudinal oil paths 122 and 12' of the first and second bearing 12 and 12' can be omitted. An oil circulating loop can still be formed in each bearing 12, 12' due to capillary action. The structure of the bearings 12 and 12' can thus be simplified.

Figure 5:
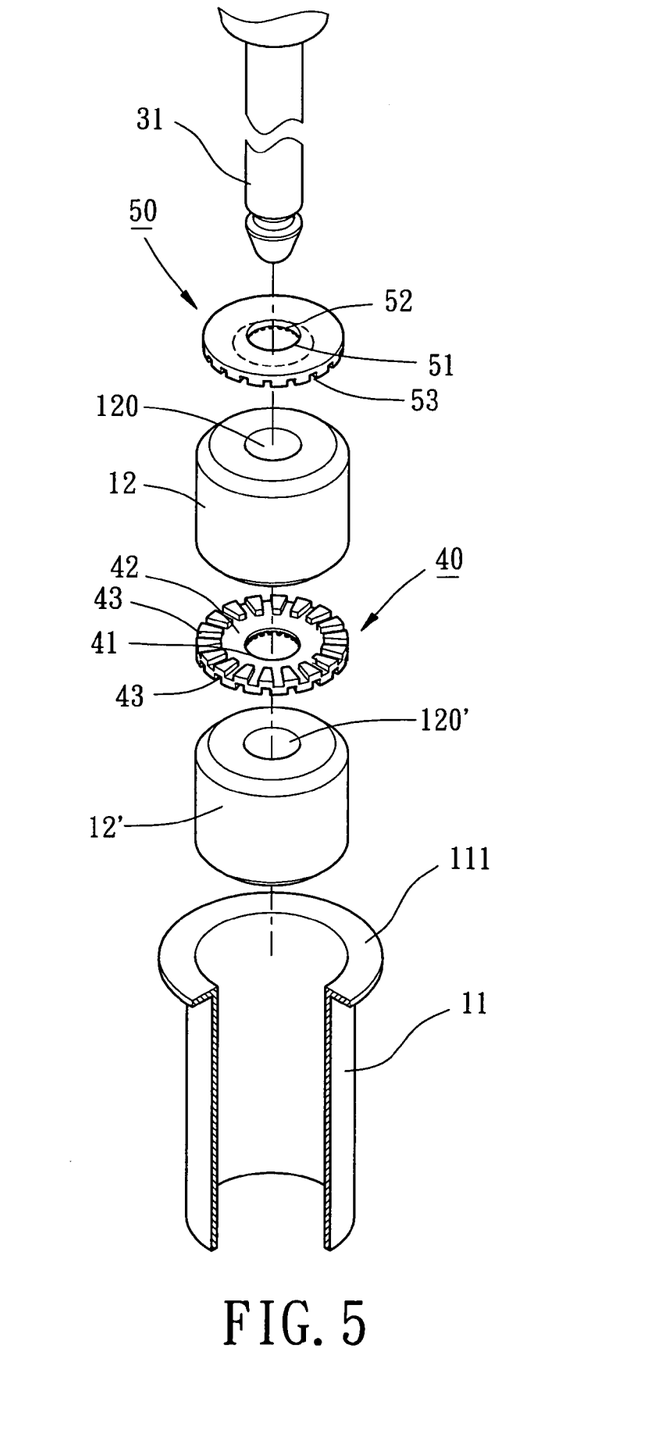
FIG. 5 is an exploded perspective view of a motor with a second embodiment of the lubricating oil guiding system in accordance with the present invention.
Figure 6:
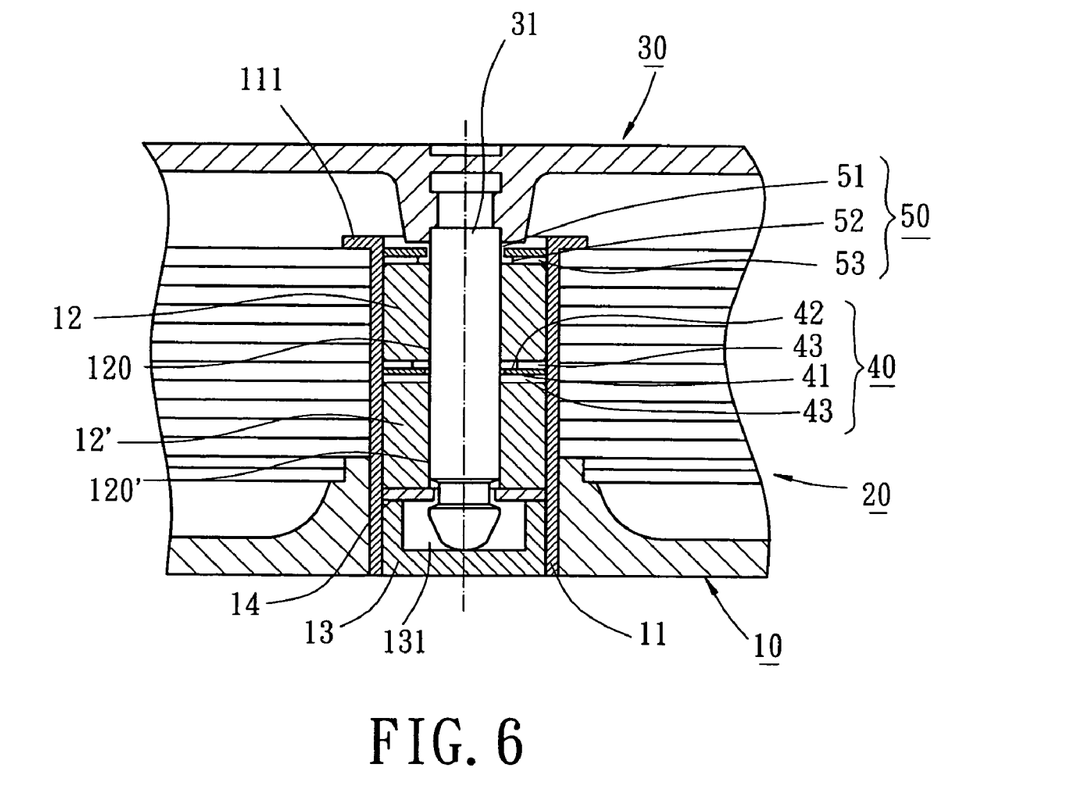
FIG. 6 is a sectional view of the motor in FIG. 5.

FIGS. 5 and 6 illustrate a second embodiment of the invention, wherein each bearing 12, 12' has an axial hole 120, 120'. The separating plate 40 includes an axial hole 41, an auxiliary oil chamber 42, and a plurality of radial oil paths 43 on each of an upper side and an underside of the separating plate 40. The auxiliary oil chamber 42 is defined in the upper side of the separating plate 40 and communicates with the radial oil paths 43 on the upper side of the separating plate 40 that form circulating paths for the first bearing 12. The radial oil paths 43 on the lower side of the separating plate 40 form oil circulating paths for the second bearing 12'. Thus, the oil circulating paths for the first bearing 12 and the oil circulating paths for the second bearing 12' would not interfere with each other. The auxiliary oil chamber 42 stores, buffers, and guides the lubricating oil and distributes the lubricating oil to the first bearing 12, thereby uniformly distributing the lubricating oil.

As illustrated in FIGS. 5 and 6, a dustproof plate 50 may be mounted to an uppermost portion of the axial tube 11 and located above the first bearing 12. An auxiliary oil chamber 52 is defined in an underside of the dustproof plate 50. Also defined in the underside of the dustproof plate 50 are a plurality of radial oil paths 53 and communicated with the auxiliary oil chamber 52, forming oil circulating paths for the first bearing 12. The auxiliary oil chamber 52 stores, buffers, and guides the lubricating oil. The life of the motor is prolonged.

Figure 7:
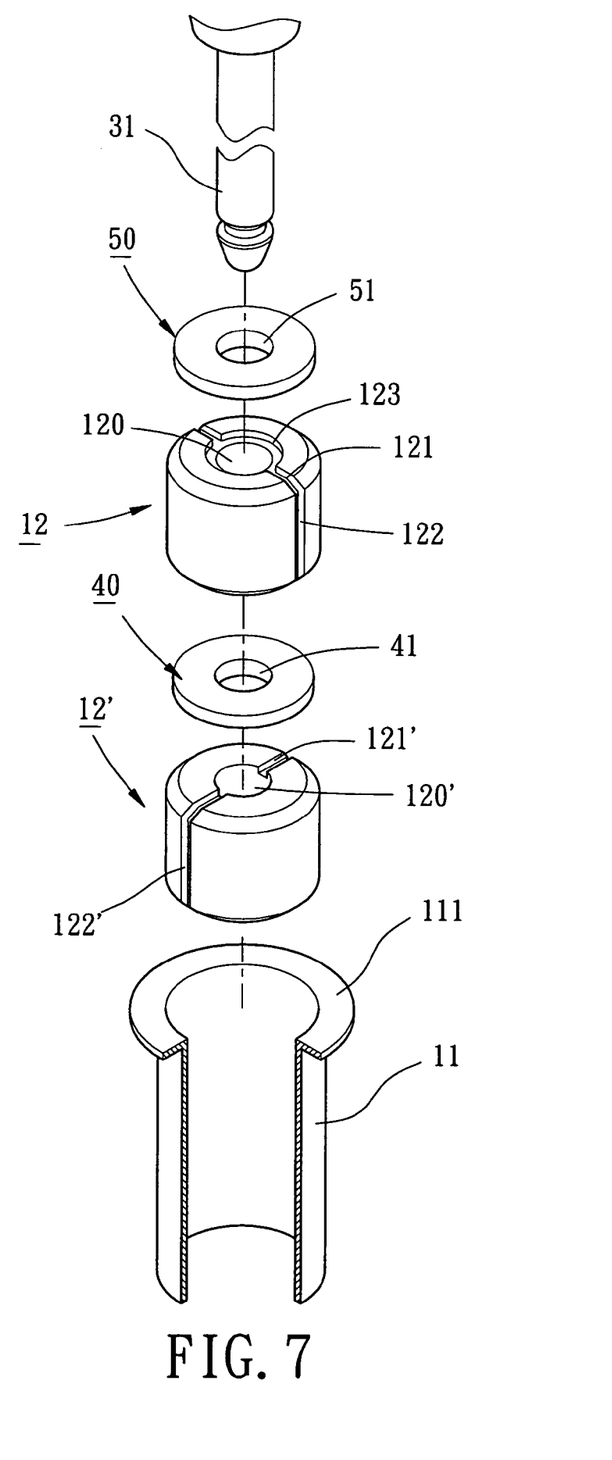
FIG. 7 an exploded perspective view of a motor with a third embodiment of the lubricating oil guiding system in accordance with the present invention.
Figure 8:
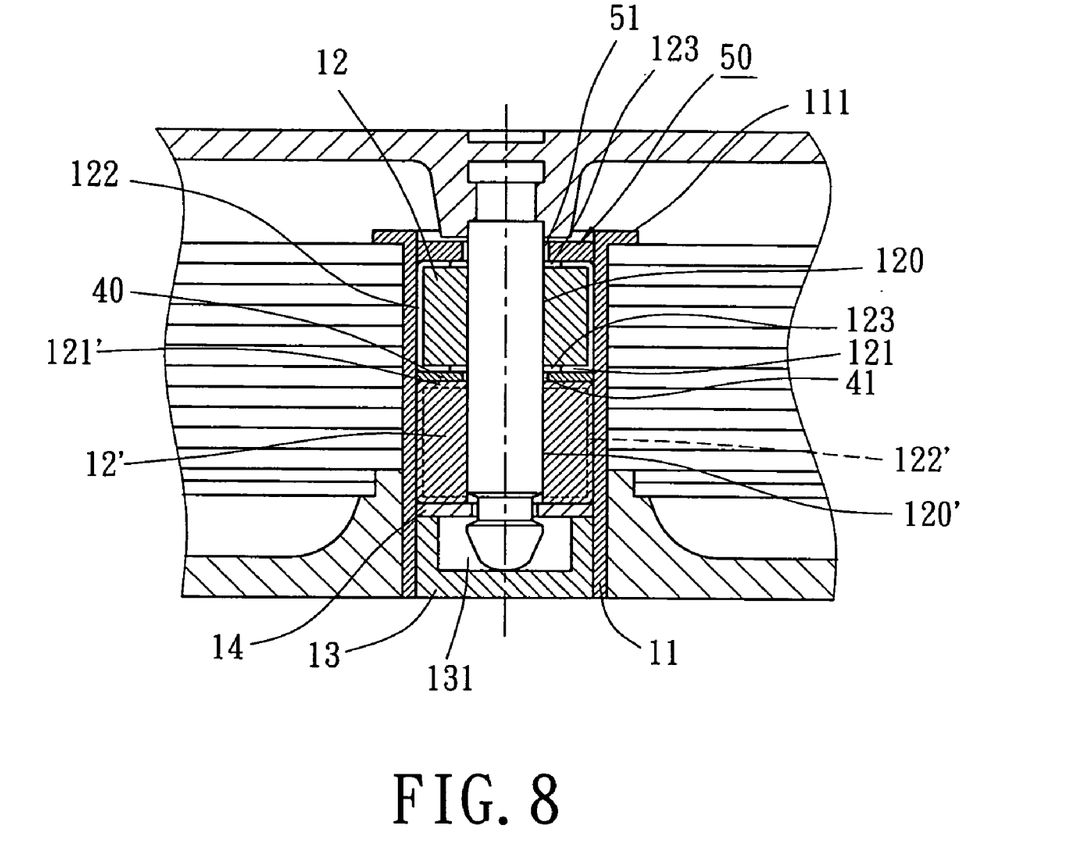
FIG. 8 is a sectional view of the motor in FIG. 7.

FIGS. 7 and 8 illustrate a third embodiment of the invention, wherein the separating plate 40 has an axial hole 41 and the dustproof plate 50 has an axial hole 51, thereby simplifying the separating plate 40 and the dustproof plate 50. Further, the first bearing 12 includes an axial hole 120, an oil circulating loop including oil paths 121 and 122 as mentioned above, and two auxiliary oil chambers 123. One of the auxiliary oil chambers 123 is defined in a top face of the first bearing 12 and communicated with the axial hole 120 of the first bearing 12, and the other auxiliary oil chamber 123 is defined in a bottom side of the first bearing 12 and communicated with the axial hole 120 of the first bearing 12. The second bearing 12' includes an oil circulating loop including oil paths 121' and 122' as mentioned above. The oil circulating loop of the first bearing 12 is separated from that of the second bearing 12' by the separating plate 40. The auxiliary oil chambers 123 store, buffer, and guide the lubricating oil to lubricate the first bearing 12, thereby avoiding non-uniform distribution of the lubricating oil, improving the overall lubricating efficiency, and reducing rotational friction to the shaft 31. The life of the motor is prolonged.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A lubricating oil guiding system for a motor, comprising:
    an axial tube including an inner periphery;
    a first bearing mounted in the axial tube and including an axial hole through which a shaft extends, the first bearing defining an oil circulating loop;
    a second bearing mounted in the axial tube and including an axial hole through which the shaft extends, the second bearing defining an oil circulating loop;
    at least one separating plate securely mounted to the inner periphery of the axial tube, said at least one separating plate including an axial hole through which the shaft extends, said at least one separating plate being located between the first bearing and the second bearing to avoid mutual interference between the oil circulating loop of the first bearing and the oil circulating loop of the second bearing; and
    at least one auxiliary oil chamber defined between the first bearing, said at least one separating plate, and the shaft for distributing lubricating oil to the first bearing and for storing, buffering, and guiding the lubricating oil.

2. The lubricating oil guiding system for a motor as claimed in claim 1, wherein the axial hole of said at least one separating plate is a conic hole that tapers downward to form said at least one auxiliary oil chamber.

3. The lubricating oil guiding system for a motor as claimed in claim 1, wherein the oil circulating loop of the first bearing includes an oil path defined in a face of one of the first bearing and said at least one separating plate, and wherein the oil circulating loop of the second bearing includes an oil path defined in a face of one of the second bearing and said at least one separating plate.

4. The lubricating oil guiding system for a motor as claimed in claim 3, wherein the oil circulating loop of the first bearing includes an upper oil path defined in a top face of the first bearing and a lower oil path defined in a bottom face of the first bearing, and wherein the oil circulating loop of the second bearing includes an upper oil path defined in a top face of the second bearing and a lower oil path defined in a bottom face of the second bearing.

5. The lubricating oil guiding system for a motor as claimed in claim 4, wherein the oil circulating loop of the first bearing further includes a plurality of longitudinal oil paths in a periphery of the first bearing, and wherein the oil circulating loop of the first bearing further includes a plurality of longitudinal oil paths in a periphery of the second bearing.

6. The lubricating oil guiding system for a motor as claimed in claim 5, wherein the oil circulating loop of the first bearing is located on a plane orthogonal to that of the circulating oil loop of the second bearing.

7. The lubricating oil guiding system for a motor as claimed in claim 3, wherein the oil circulating loop of the first bearing includes a plurality of radial oil paths in an upper side of said at least one separating plate.

8. The lubricating oil guiding system for a motor as claimed in claim 7, wherein said at least one auxiliary oil chamber is defined in the upper side of said at least one separating plate and communicated with the radial oil paths.

9. The lubricating oil guiding system for a motor as claimed in claim 3, wherein the oil circulating loop of the second bearing includes a plurality of radial oil paths in an underside of said at least one separating plate.

10. The lubricating oil guiding system for a motor as claimed in claim 1, wherein said at least one auxiliary oil chamber is defined in a bottom face of the first bearing and communicated with the axial hole of the first bearing.

11. The lubricating oil guiding system for a motor as claimed in claim 1, wherein said at least one auxiliary oil chamber is defined in an upper side of the first bearing and communicated with the axial hole of the first bearing.

12. The lubricating oil guiding system for a motor as claimed in claim 1, further including a dustproof plate mounted to an uppermost portion of the inner periphery of the axial tube for shielding the first bearing.

13. The lubricating oil guiding system for a motor as claimed in claim 12, wherein the dustproof plate includes an axial hole through which the shaft extends, the axial hole of the dustproof plate tapering upward to form another auxiliary oil chamber.

14. The lubricating oil guiding system for a motor as claimed in claim 12, wherein the dustproof plate includes a plurality of radial oil paths in an underside thereof.

15. The lubricating oil guiding system for a motor as claimed in claim 14, wherein the dustproof plate includes an axial hole through which the shaft extends, another auxiliary oil chamber being defined in the underside of the dustproof plate, with said another auxiliary oil chamber being communicated with the axial hole of the dustproof plate and the radial oil paths.

16. The lubricating oil guiding system for a motor as claimed in claim 1, wherein said at least one separating plate is integrally formed with the inner periphery of the axial tube.

17. The lubricating oil guiding system for a motor as claimed in claim 1, further including a substantially U-shaped supporting member mounted to a bottom portion of the axial tube for supporting the shaft, the supporting member defining a primary oil chamber for receiving the lubricating oil.

18. The lubricating oil guiding system for a motor as claimed in claim 1, wherein said at least one auxiliary oil chamber extends downward from the axial hole of said at least one separating plate to the second bearing.

* * * * *